United States Patent [19]

Oishi et al.

[11] Patent Number: 4,638,393
[45] Date of Patent: Jan. 20, 1987

[54] MAGNETIC TAPE CASSETTE HAVING AN IMPROVED BRAKING MECHANISM

[75] Inventors: Kengo Oishi; Osamu Suzuki, both of Kanagawa, Japan

[73] Assignee: Fuji Photo Film Co., Ltd., Kanagawa, Japan

[21] Appl. No.: 529,180

[22] Filed: Sep. 2, 1983

[30] Foreign Application Priority Data

Sep. 2, 1982 [JP] Japan .............................. 57-151781

[51] Int. Cl.4 ............................................. G11B 23/02
[52] U.S. Cl. ..................................... 360/132; 242/198
[58] Field of Search .................................. 360/92–93, 360/132; 242/197–201

[56] References Cited

U.S. PATENT DOCUMENTS 4,106,724 8/1978 Higashida ........................... 242/198
4,288,048 9/1981 Sieben .................................. 242/198
4,513,929 4/1985 Oishi et al. ........................... 360/132

Primary Examiner—John H. Wolff
Assistant Examiner—David J. Severin
Attorney, Agent, or Firm—Sughrue, Mion, Zinn, Macpeak, and Seas

[57] ABSTRACT

A magnetic tape cassette is provided with a pair of rotatable reels each having an upper and lower flange formed with suitable gear teeth. A braking assembly is comprised of first and second ratchet pawls pivotally mounted on a support member which is slidably mounted on the housing of the cassette. The first ratchet pawls are spring biased into engagement with one of the flanges of each reel and are adapted to be pivoted upon insertion of a brake release lever into the cassette. The second ratchet pawl engages the other flange of each reel when the support member is in a first position and is disengaged therefrom when the support member is in a second position.

4 Claims, 2 Drawing Figures

MAGNETIC TAPE CASSETTE HAVING AN IMPROVED BRAKING MECHANISM

BACKGROUND OF THE INVENTION

The present invention is directed to a magnetic tape cassette and more particularly to a magnetic tape cassette which includes a pair of tape reels having upper and lower flanges with teeth, and brake members engageable therewith for stopping the reels to prevent unauthorized rotation thereof.

As is well known in the art, a conventional video tape cassette has an elongated opening in the front surface and the opening is covered by a guard panel which is pivotally mounted on the cassette side wall. With the guard panel pivoted to the open position, the magnetic tape may be pulled out of the cassette through the opening.

When the reels in the cassette are turned by the operator carelessly or when the reels are turned unintentionally due to vibrations when the cassette is not in use, the tape wound on the reels is liable to run unintentionally. Accordingly, the slack tape adjacent the opening could be the cause of damage to the tape when the guard panel is opened or closed.

Accordingly, a mechanism is provided in such a conventional video tape cassette to prevent the occurrence of the above described difficulties which might occur when the tape is unintentionally slackened or pulled out of the cassette. For example, the peripheral portion of one of the flanges of each tape reel is formed into a flat tooth-shaped or saw-tooth-shaped gear and ratchet pawls are provided within the cassette for engagement with the gears. When the cassette is not in use, the ratchet pawls are engaged with the gears to prevent the tape from becoming slack. When the tape cassette is loaded into a video tape recorder (hereinafter referred to as a VTR) a brake release lever is inserted into the cassette to disengage the ratchet pawls from the gears. However, such an arrangement within a cassette is still disadvantageous with respect to the following points. When the cassette is loaded into the VTR as described above the braking ratchet pawls are released. Therefore, the cassette is in the standby state for starting of the VTR and may be maintained in such a standby state for a long period of time during which the tape may become slack due to vibrations or the like. For example, the video tape recorder is frequently carried about subsequent to the insertion of the cassette into the recorder. This is especially true in the case of small tape cassettes which are loaded into portable video cameras.

SUMMARY OF THE INVENTION

The present invention provides a new and improved magnetic tape cassette wherein the tape is prevented from becoming slack even during the starting standby state of the VTR subsequent to the insertion of the cassette into the VTR and when the cassette is not in use the slackening of the tape can be positively prevented as compared to conventional tape cassettes.

The present invention provides a new and improved magnetic tape cassette having a pair of tape reels, each of which is provided with upper and lower flanges with one of said flanges having the periphery formed into a flat-tooth-shaped gear and the other having a periphery formed into a saw-tooth-shaped gear, first ratchet pawls engageable with said flat-tooth-shaped gears, a second ratchet pawl engageable with said saw-tooth-shaped gears and support means for said first and second ratchet pawls moveably mounted in said cassette for movement of said support means by means of a brake release lever to disengage said second ratchet pawl from said saw-tooth-shaped gear subsequent to the insertion of the brake release lever into said cassette to disengage said first ratchet pawls from said flat-tooth-shaped gears.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
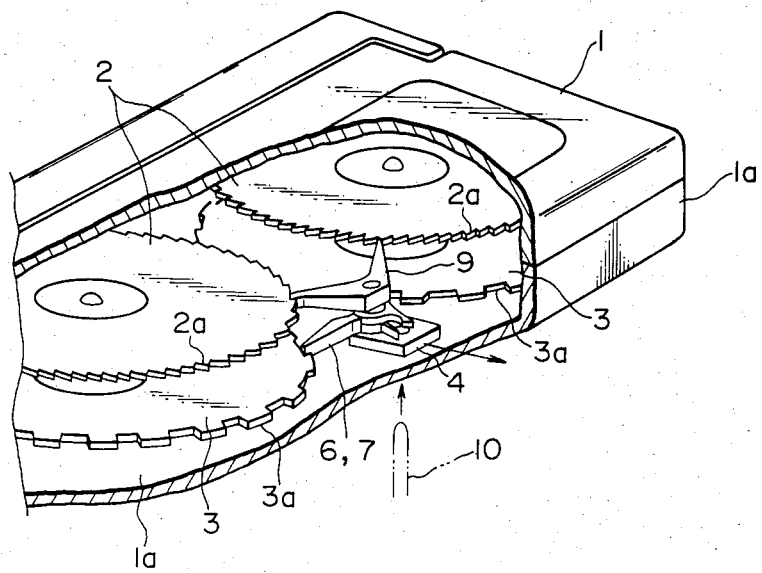
FIG. 1 is a perspective view, partially broken away, showing the braking arrangement for the reels of the magnetic tape cassette according to the present invention.

As shown in FIG. 1 a pair of tape reels are each provided with an upper flange 2 and a lower flange 3 and are mounted for rotation within a cassette 1 in the usual manner. The peripheral portion of the upper flange 2 of each tape reel is formed into a saw-tooth-shaped gear 2a while the peripheral portion of the lower flange 3 of each tape reel is formed as a flat-tooth-shaped gear 3a. A reel braking assembly 4 is moveably mounted on the lower cassette half 1a for sliding movement in the direction of the double headed arrow as shown in FIG. 1. The braking assembly 4 includes a pair of first ratchet pawls 6 and 7 which are engageable with the gears 3a and a second ratchet pawl 9 which is engageable with the gear 2a.

The braking assembly 4 is comprised of a supporting member 5 having a post 5a extending upwardly therefrom upon which the first and second ratchet pawls are pivotally mounted. A hole 5b is provided in the supporting member 5 into which a brake release lever 10 may be inserted. The brake release lever 10 is part of the video tape recorder and has been illustrated in phantom lines since it is not considered part of the present invention. The first ratchet pawls 6 and 7 are pivotally mounted on the post 5a in such a manner that they can each rotate through a pre-determined angle. The ratchet pawls 6 and 7 are urged outwardly by the spring means 8 so that the engaging portions 6b and 7b of the ratchet pawls 6 and 7 engage the flat-tooth-shaped gears 3a. The ratchet pawls 6 and 7 further include abutting portions 6a and 7a which are adapted to be engaged by the brake release lever 10 when it is inserted through the hole 5b to pivot the engaging portions 6b and 7b about the post 5a. The second ratchet pawl 9 is pivotally mounted on the post 5a above the ratchet pawls 6 and 7.

When the braking assembly 4 is located in the position as shown in FIG. 1 when the cassette 1 is not in use, the engaging portions 6b and 7b of the first ratchet pawls 6 and 7 engage the gears 3a and the engaging portions 9a of the second ratchet pawl 9 are disposed in engagement with the gears 2a so that the tape reels are locked against rotation. The braking assembly 4 may be biased to be normally located in the position of FIG. 1 or the slidable mounting means for the braking assembly 4 may be such as to frictionally hold the braking assembly in the desired position.

Figure 2:
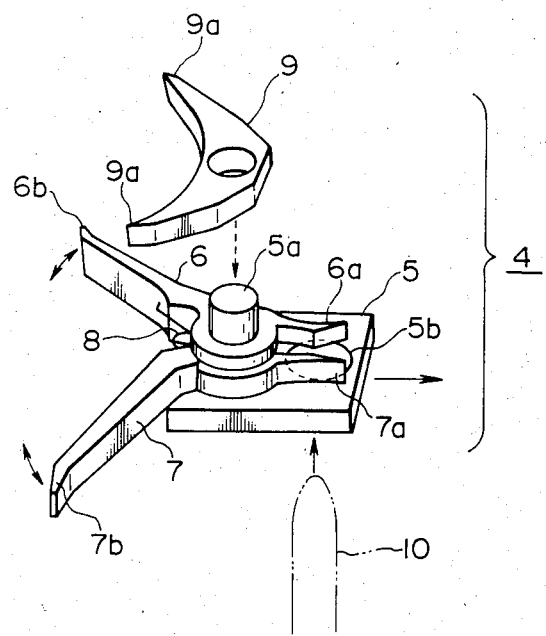
FIG. 2 is a partially exploded perspective view of the braking means according to the present invention.

When the cassette 1 is loaded into a video tape recorder or the like, the brake release lever 10 will automatically be inserted into the hole 5b of the supporting member 5 so as to engage the portions 6a and 7a to move them apart against the biasing force of the spring 8. This pivoting action imparted to the pawls 6 and 7 causes the engaging portions 6b and 7b to be moved out of engagement with the gears 3a. During this operation the second ratchet pawl 9 is still maintained in engagement with the gears 2b. When an operating button, or any other suitable control on the VTR is operated, the brake release lever 10 will be moved causing the braking assembly 4 to move in its entirety in the direction of the arrow as shown in FIG. 2, whereby the engaging portions 9a of the ratchet pawl 9 will be disengaged from gears 2a.

As is apparent from the foregoing description, the tape cassette according to the present invention is provided with means to prevent the tape from becoming slack even when the tape cassette is in the standby position after being loaded into a VTR or the like for recording pictures. Such an arrangement is extremely effective when applied to a small tape cassette which is loaded directly into a portable video camera. Furthermore, the tape reels of the cassette according to the present invention are more positively locked when the cassette is stored than with the arrangement described above to respect to conventional cassettes.

While the invention has been particularly shown and described with reference to a preferred embodiment thereof it will be understood by those in the art that various changes in form and details may be made therein without departing from the spirit and scope of the invention.

What is claimed is:

1. A magnetic tape cassette comprising a pair of tape reels rotatably mounted within said cassette for rotation about parallel spaced apart axes, each reel having upper and lower flanges with one of said flange having the periphery thereof formed into a flat-tooth-shaped gear and the other of said flanges having a periphery thereof formed into a saw-tooth-shaped gear, and a reel braking assembly moveably mounted within said cassette comprising first ratchet pawls engageable with said flat-tooth-shaped gears, second ratchet pawls engageable with said saw-tooth-shaped gears, and support means for said first and second ratchet pawls, said first ratchet pawls being selectively disengageable from said flat-tooth-shaped gear at a first time during operation of a tape recorder, said second ratchet pawls being selectively disengageable from said saw-tooth-shaped gear at a second time, subsequent to said first time, during said operation of said tape recorder.

2. A magnetic tape cassette as set forth in claim 1 wherein said first and second ratchet pawls are pivotally mounted on said support. means which is slidably mounted in said cassette for movement between first and second positions.

3. A magnetic tape cassette as set forth in claim 2 further comprising spring means normally biasing said first ratchet pawls into engagement with said flat-tooth-shaped gears when said support means is disposed in said first position and wherein said second ratchet pawl is disposed in engagement with said saw-tooth-shaped gears when said support means is in said first position and is out of engagement with said saw-tooth-shaped gears when said support means is in said second position.

4. A magnetic tape cassette as set forth in claim 3 wherein said support means is provided with an aperture for the reception of a brake release lever and said first ratchet pawls are provided with means adapted to be engaged by said gear release lever upon insertion through said aperture to pivot said first ratchet pawls out of engagement with said flat-tooth-shaped gears against the bias of said spring means.

* * * * *